United States Patent [19]
Jones et al.

[11] Patent Number: 6,037,031
[45] Date of Patent: Mar. 14, 2000

[54] FLOTATION SEAWAY

[75] Inventors: William Steven Jones, Panama City Beach; James Edwin Rumbough, Panama City, both of Fla.

[73] Assignee: The United States of America as represented by the Secretary of the Navy, Washington, D.C.

[21] Appl. No.: 08/874,202

[22] Filed: May 27, 1997

[51] Int. Cl.[7] .................................................. B63B 35/44
[52] U.S. Cl. ........................... 428/71; 114/266; 428/107; 428/112; 428/117; 428/118; 428/223; 428/316.6
[58] Field of Search ............................. 428/71, 117, 118, 428/615, 304.4, 316.6, 107, 112, 223; 264/46.7; 114/266

[56] References Cited

U.S. PATENT DOCUMENTS

| | | | |
|---|---|---|---|
| 2,669,960 | 2/1954 | Laycock | 114/266 |
| 3,025,202 | 3/1962 | Morgan et al. | 264/46.7 |
| 3,157,144 | 11/1964 | De Jarnett | 264/46.7 |
| 3,239,982 | 3/1966 | Nicosia | 264/46.7 |
| 3,305,991 | 2/1967 | Weismann | 264/46.7 |
| 3,472,728 | 10/1969 | Hitch | 428/71 |
| 3,665,882 | 5/1972 | Georgieu et al. | 114/266 |
| 3,672,022 | 6/1972 | York | 428/594 |
| 3,795,559 | 3/1974 | Horn et al. | 428/71 |
| 3,834,962 | 9/1974 | Strumbos | 428/71 |
| 3,842,768 | 10/1974 | Maistre | 114/266 |
| 3,970,324 | 7/1976 | Howat | 428/71 |
| 3,977,344 | 8/1976 | Holford . | |
| 4,051,591 | 10/1977 | Thompson . | |
| 4,067,285 | 1/1978 | Jones et al. | 114/266 |
| 4,137,354 | 1/1979 | Mayes, Jr. et al. | 428/118 |
| 4,482,590 | 11/1984 | Bouley et al. | 428/36.5 |
| 4,486,996 | 12/1984 | Alejos | 264/46.7 |
| 4,554,883 | 11/1985 | Lane | 114/266 |
| 4,614,013 | 9/1986 | Stevenson | 264/46.7 |
| 5,070,673 | 12/1991 | Weisse | 428/118 |
| 5,102,723 | 4/1992 | Pepin | 428/117 |
| 5,107,785 | 4/1992 | Baxter . | |
| 5,152,018 | 10/1992 | Lea | 428/71 |
| 5,595,806 | 1/1997 | Korfmacher | 428/71 |
| 5,611,977 | 3/1997 | Takei | 264/46.7 |
| 5,632,940 | 5/1997 | Whatley | 264/46.7 |

FOREIGN PATENT DOCUMENTS

| | | | |
|---|---|---|---|
| 2 441 537 | 7/1980 | France | 114/266 |
| 34 05 231 | 10/1984 | Germany | 264/46.7 |
| 284684 | 1/1971 | U.S.S.R. | 114/266 |

Primary Examiner—Allan R. Kuhns
Attorney, Agent, or Firm—Harvey A. Gilbert; Donald G. Peck

[57] ABSTRACT

A platform, breakwater, or endless track includes an array of molded cells interconnected by a system of elongate flexible members, such as wire ropes or lines. The molded cells are cast in molds located at overlapping portions of the cables. The molds may be flexible nylon bags having openings for receiving the cables through them and a fill port to receive material. The molds may be retained on cast cells or removed and reused. A buoyant material, such as expanding self-hardening foam is pumped from foam mixing and pumping equipment into the molds to cast the cells for floating on water, although negatively buoyant cells could be cast for some applications. The cells may be cast on site or elsewhere and then transported to the work site. The cables either can be secured or free running in the molded cells. Accordingly, flotation cells may be separated by lengths of cables to provide for venting the effects of underwater detonations and for dissipating surface wave energy, or flotation cells may be drawn together to provide a solid work platform or roadway. An endless-track mine clearing structure that is readily repairable may be constructed from the cells and cables. Sections of molded cells and cables can be interconnected to provide differently sized and shaped platforms for various applications.

13 Claims, 4 Drawing Sheets

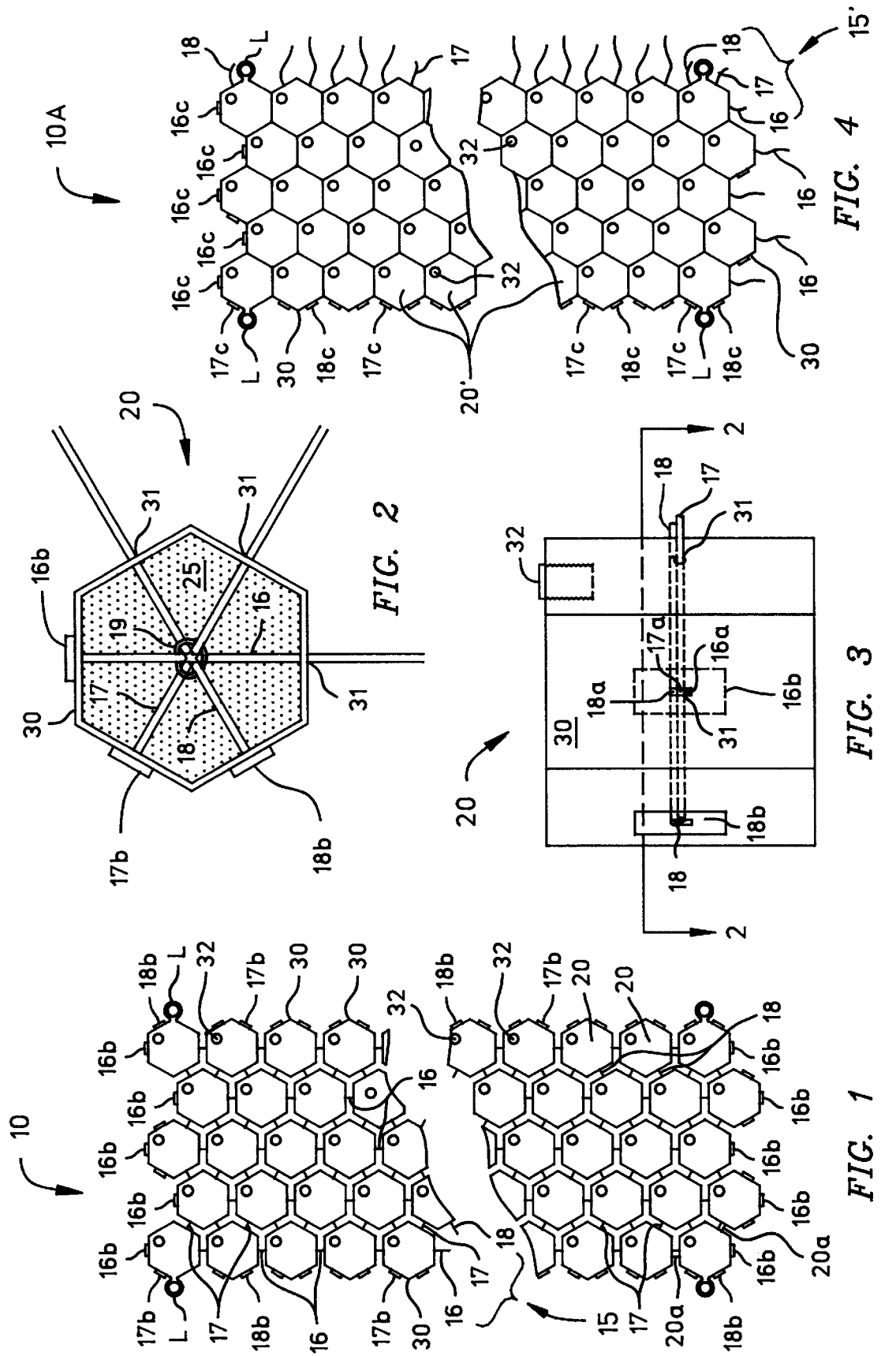

FLOTATION SEAWAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to structures for floating on water. In particular, this invention relates to rapidly deployable structures having flotation cells molded on systems of cables and methods of fabrication thereof.

The current methods for providing working areas in swamps, marshes and shallow water leave much to be desired. Generally speaking, most of the methods call for building-up the proposed work site with large quantities of fill dirt, making elaborate manmade structures having pilings and elevated work platforms, or bringing in awkward barges that are difficult to maneuver. These methods consume considerable amounts of time and material and, usually, an inordinate amount of equipment must be brought in to build the platforms. Furthermore, the elaborate construction procedures and roads necessary to get to and from the work area can and do cause excessive ecological damage.

When helicopter fields or air fields are needed in marshy or wet areas, the areas usually must be improved using huge volumes of fill dirt. Next, pierced steel planking is laid which requires considerable heavy equipment and a large sea-lift load. These requirements may severely limit the areas that are suitable for such military fields. In addition, the contemporary construction techniques are unduly time consuming and, consequently, could produce an unacceptable delay in the buildup of forces.

A more acceptable, quickly deployed means for passing over dangerous shallow water areas is needed. Presently, crossing obstacle-laced and mined surf and beach zones relies on brute force methods, such as detonating explosive line charges, explosive nets, bombs and swimmer-deployed countermeasure charges. Large quantities of explosives and/ or skilled manpower are used to clear mines from the avenue of advance of the fighting forces. The M-58 line charge is a typical explosive launched by an MK-22 rocket motor. Unfortunately, detonations of some line charges may cause only some mines to explode, so that large numbers of mines might be left in the path of the advance. In addition, detonations by line charges may not clear magnetic influence mines. Consequently, after line charges are detonated, the area must be closely checked for unexploded mines.

In addition, a better way to cross rivers is needed. For years pontoon bridges or Bailey bridges have been used. These bridges require long times to emplace and large volumes of shipping space. Moreover, these bridges are not easily repaired, nor do they provide for easy expansion in case of rising water.

Thus, in accordance with this inventive concept, a need has been recognized in the state of the art for rapidly deployed structures having molded cells and method of manufacture thereof.

SUMMARY OF THE INVENTION

The present invention is directed to providing a method for making structure that floats on water. Overlapping elongate flexible members produces overlapping portions for molding cells at the overlapping portions. Structure includes a plurality of elongate flexible members having overlapping portions and an array of molded cells each disposed at separate overlapping portions of the flexible members.

An object is to provide structure having an array of molded cells mounted on a system of cables.

Another object is to provide structure in which damaged molded cells may be repaired or replaced without disassembly of associated structure.

Another object is to provide structure having cells molded from rigid or semi-rigid foam on cables.

Still another object is to provide methods of making structure using preassembled cables and molds for cells that are cast at the work site.

Another object is to provide portable structure of reduced weight.

An object of the invention is to provide improved flotation structure for platforms or breakwaters.

Another object is to provide flotation structures having arrays of molded flotation cells mounted on systems of cables.

Another object is to provide structures that can be changed to adapt to different applications.

Another object is to provide cells made from self-hardening foam, any rigid or semi-rigid polymeric material, concrete over air bags, or metal.

Another object is to provide flotation structure in which damaged flotation cells may be repaired or replaced without disassembly of associated structure.

Still another object is to provide methods of making flotation structures using preassembled cables and molds for flotation cells that are cast at the work site.

Another object is to provide flotation structures having flotation cells made from self-hardening foam, any rigid or semi-rigid polymeric material, concrete over air bags or metal.

Still another object is to provide flotation structures having few, if any, ferrous components to reduce the effects of rust and corrosion.

Another object is to provide breakwater platforms having flotation cells separated from one another.

Yet another object is to provide platform structures having flotation cells abutting one another to provide flat surfaces.

Another object is to provide endless track of molded cells mounted on cables for clearing mines.

These and other objects of the invention will become more readily apparent from the ensuing specification when taken in conjunction with the appended claims.

BRIEF DESCRIPTION OF THE DRAWINGS

FIG. 1 is a top view of a flotation platform having spaced-apart flotation cells according to this invention.

FIG. 2 is a cross-sectional view taken alone lines 2—2 in FIG. 3 that shows details of a flotation cell with buoyant material securely engaging cables to space cells apart as shown in FIG. 1.

FIG. 3 is a side view of the cell of FIG. 2.

FIG. 4 is a top view of another embodiment of the invention having flotation cells drawn together to provide a substantially uninterrupted surface.

DESCRIPTION OF THE PREFERRED EMBODIMENT

Figure 5:
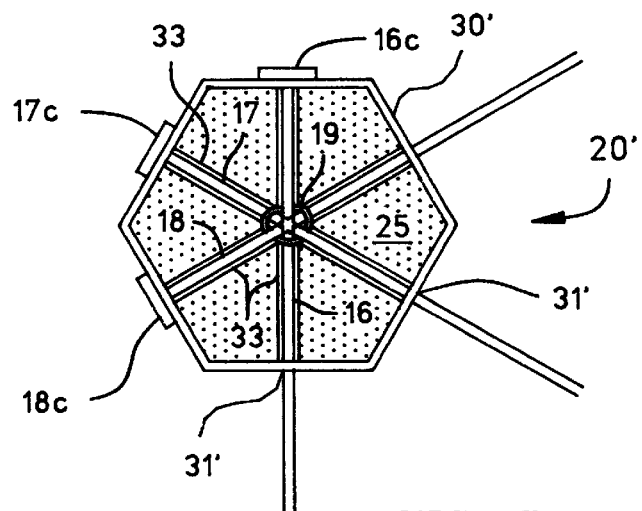
FIG. 5 shows details of a flotation cell shown in FIG. 4 having sleeves sized to slidably receive cables for free running therethrough.

Referring to FIG. 1 of the drawings, flotation platform 10 and its expedient method of fabrication provide for buoyant support of men, materials, and supplies to assure safe transit across otherwise hazardous areas, such an obstacle-laced and mined beach zones, for example. Flotation platform 10 is intended to float on water and is fabricated from system of cables 15 coupled to array of flotation cells 20.

System of cables 15 includes a plurality of parallel longitudinally extending cables 16 that reach the entire length of platform 10 and first and second sets of parallel obliquely extending cables 17 and 18 that go from one side to the other of platform 10. First set of cables 17 obliquely extends across longitudinal 16 cables in one direction from one side of platform 10 to the other side. Second set of cables 18 obliquely extends across longitudinal cables 16 and oblique cables 17 from one side to the other side of platform 10 in the opposite direction than cables 17. Thus, longitudinal cables 16 and first and second sets of oblique cables 17 and 18 respectively have overlapping portions 16a, 17a, and 18a where they overlap each other.

FIGS. 2 and 3 show that overlapping portions 16a, 17a, and 18a are located in the center of each flotation cell 20. Optionally, guide element 19 may be included in each flotation cell 20 to position cables 16, 17, and 18 so that overlapping portions 16a, 17a, and 18a are centered in each flotation cell 20, see FIG. 2. Guide element 19 may also grip or otherwise engage overlapping portions 16a, 17a, and 18a to secure the overlapping portions in each cell. Hence, guide element 19 helps assure separation between flotation cells 20 in platform 10. In addition, biasing spacer 20a also may be included between adjacent cells 20. Biasing spacer 20a may be resilient material, coiled spring, or similar biasing member that resiliently urges the separation of adjacent cells. Only two such biasing spacers are shown in FIG. 1 to avoid cluttering the drawings, it being understood that biasing spacers could be included between all the cells herein described. This separation may be a desirable feature to help avoid wear, to vent the force of possible underwater explosions that might otherwise damage platform 10, or to dissipate flotsam that may otherwise accumulate.

Cables 16, 17, and 18 may be fabricated from many different elongate flexible members including natural fibers, manmade fibers, metal cables or nonmetal cables as the situation requires. Commercially available wire rope and other steel-based cables have sufficient strength and flexibility to perform satisfactorily; however, they are vulnerable to rust and other corrosive influences that may compromise their usefulness. Accordingly, since platform 10 is to be used in fresh or salt water, cables 16, 17, and 18 may be constructed from any of many commercially available natural or synthetic fibers, such as nylon, for example.

While the system of longitudinal and oblique cables has been described herein, it is to be understood that other cable assemblies might be used within the scope of this invention. For example, having the teachings of this invention in hand, one skilled in the art might make rectangular, square or other matrices of longitudinal and lateral cables and cells, and still be within the scope of this inventive concept.

Flotation cells 20 are buoyant structures formed in molds 30. FIGS. 2 and 3 show in greater detail flotation cell 20 made from buoyant material 25 that fills mold 30. The molds may be rigid or flexible bag-like forms that may be removed and reused or may remain on the cast flotation cells to provide an additional measure of protection. In the drawings the flotation cells are hexagonally-shaped parallelepipeds. The flotation cells could have many different shapes, such as hexagonal, cylindrical or square parallelepipeds, etc. An endless-track structure, such as described below, may find tapered hexagonally-shaped cells more useful. The shape of the flotation cells is decided by the requirements of the job at hand. Therefore, it is to be understood that, having the teachings of this invention in hand, one skilled in the art to which this invention pertains could configure the cells in many different shapes, besides hexagonal, cylindrical or square parallelepipeds, etc., and still be within the scope of this invention.

Molds 30 are fashioned in closed bag-like shapes from flexible material, although rigid molds could be made and used in accordance with this inventive concept. The flexible bag of each mold 30 has bottom, sides, and top defining a mold for a hexagonal parallelepiped-shaped cell. Mold 30 has openings 31 to receive cables 16, 17, and 18 therethrough so that overlapping portions 16a, 17a, and 18a can be located in the center of the mold. Fitting 32 extends through the flexible material of each mold and receives buoyant material 25, such as self expanding and hardening foam, through hose 27 from mixing and pumping equipment 26, see FIG. 8. Fitting 32 preferably is flush with the upper surface of mold 30 and has a one-way valve, not shown, to prevent foam from leaving mold 30 after it has been pumped into the mold. Guide element 19 may be positioned in each mold 30 before the casting material is added.

Bearing plates 16b, 17b, and 18b are mounted on some flotation cells 20 to secure distal ends of the cables to the perimeter of platform 10, see FIGS. 1 and 2. In FIG. 2 one end of one longitudinally extending cable 16 is secured to bearing plate 16b. Plate 16b is mounted on the outer surface of mold 30 which contains flotation cell 20 that is located at one longitudinal end of floating platform 10. The opposite end of this longitudinal cable 16 is secured to a similar plate 16b on the outer surface of another flotation cell at the opposite end of platform 10. Similarly, the other longitudinal cables also are secured at their opposite ends to bearing plates in flotation cells at opposite ends of platform 10. In like manner, bearing plates 17b and 18b are attached to opposite ends of oblique cables 17 and 18, respectively. These plates are carried on opposite sides of lateral-most flotation cells 20 of platform 10. All the bearing plates at opposite ends and opposite sides help provide structural integrity for the platform.

Buoyant material 25 can be any of a number of self-hardening foams, any rigid or semi-rigid polymeric material, small hollow spheres or chip-sized pieces of material that float, or concrete over air bags or metal shells. Lightweight concrete might be made by replacing the stone aggregate with a lightweight aggregate. The bag-shaped molds might be partially filled with foam and then topped-off with concrete.

However, for some applications of this invention, material 25 can be a material that is not buoyant. For example, as explained below, the invention might be used for land mine clearing and it may be desirable to have the cells negatively buoyant so as to exert greater pressure on the ground.

For the purposes of setting forth salient features of this invention, however, buoyant material 25 is made from a self-expanding and self-hardening foam, such as rigid polyurethane foam. This foam is shipped and stored as a two-part liquid that can be handled and mixed using well known fluid mixing and pumping equipment 51, see FIG. 8. One of the characteristics of rigid polyurethane foam is that after mixing, it expands up to sixty times its original volume. These properties make this foam attractive for this invention since it takes less storage space and can be mixed and cast in bag-like molds 30 at the work site.

Rigid polyurethane foam is well known in the art and is available from several commercial sources. For example, selections of a desirable polyurethane foam could be made from components marketed under the trade designations: NCF1811-91 by North Carolina Foam Industries of North Carolina, BKC 44307 by Kansas City Division of Allied Signal at Kansas City, PP475-20 by Premium Polymers Company, or Stathane 4802W, Stathane 6603 MSH or Stathane 6502 MSH by Expanded Rubber and Plastics Company.

These foams and other commercially available materials could be selected and applied. For example, the polyurethane NCF1811-911 comes in two parts. The two part materials are mixed, fed into mold 30, expand, foam, and then further expand before hardening into a rigid or semi-rigid form, in this case, hexagonally-shaped flotation cells 20. The wide variety of foams available have different rise times, tack-free time, curing times, and densities. Accordingly, having the teachings of this invention before him, a designer is free to select the foam needed for the job at hand.

The technique of mixing the constituents of the foam is well established in the art. It involves a continuous process of mixing the two part viscous liquids in a static or motionless mixer. Typically, the viscosities of two representative foam components are in the range of from 320 centipoise to 580 centipoise. A motionless mixer uses stationary-shaped diverters inside conduits, or pipes, which force the fluids to mix themselves through a progression of divisions and recombinations. This forms striations of ever decreasing thickness until the stream is uniform. Motionless mixers continuously interchange fluid materials between the walls and the center of the conduit, to enhance heat transfer and uniform residence times. The power consumed by motionless mixer 51 during mixing is provided by an interconnected pump which moves the fluids against the resistances of the diverters.

Referring to FIG. 1, platform 10 may be used for off-loading materials and supplies. Overlapping portions of cables 16, 17, and 18 are cast and secured within each of the buoyant cells as shown in FIGS. 2 and 3. This securing provides spaces between adjacent cells so that possible explosions and wave energy can be dissipated and flotsam can be washed away. Cleats or loops L may be provided on some cells to receive lifting, towing, or anchoring lines.

FIGS. 4, and 5 show flotation platform 10A having modified flotation cells 20'. The modifications in flotation cells 20' permit their slidable displacement on cables 16, 17, and 18 so that the cells can be pulled together as shown to create an uninterrupted flat surface or roadway. Noting FIG. 5, each flotation cell 20' has lateral sleeves 33 that extend from one side to the other through openings 31' of each mold 30'. Lateral sleeves 33 keep cables 16, 17, and 18 from being engaged by the casting material and are sized to slidably receive these cables and allow their free-running therethrough. Distal ends of flexible members 16, 17, and 18 are secured to bearing plates 16c, 17c, and 18c that are molded or otherwise suitably attached to the outer surfaces of flotation members 20'. These plates are located on the periphery of one side and one end of flotation platform 10A, see FIG. 4.

After flotation cells 20' have been cast and flotation platform 10A is emplaced or located, tensile forces are exerted on cables 16, 17, and 18. The tensile forces pull on bearing plates 16c, 17c, and 18c to draw the hexogonally-shaped flotation cells 20' together to form a flat coextensive working surface. After the cells are drawn together, the opposite ends of flexible members 16, 17, and 18 are appropriately secured to hold the platform together.

The hexagonally-shaped parallelepiped form of the cast flotation cells provides a solid interlocking structure when the cells are drawn together. This interlocked structure resists wave and surf action. The simple tensioning of the cables to tighten-up the cells of platform 10A can be done at or away from the work site depending on the situation. Cleats or loops L may be provided on some cells to receive lifting, towing, or anchoring lines.

Figure 6:
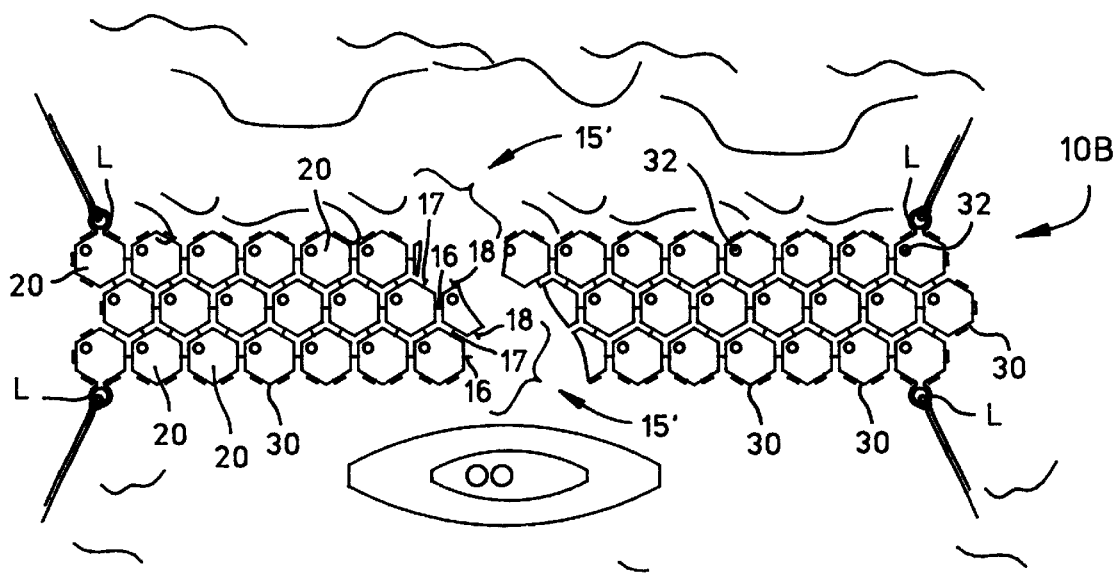
FIG. 6 is another embodiment of the invention used as an offshore breakwater.

FIG. 6 shows breakwater structure 10B. Breakwater 10B is substantially identical to a portion of the spaced-apart system of cables and flotation cells of flotation platform 10 in FIG. 1. The buoyant material of each buoyant flotation cell 20 engages the overlapping portions of cables 16, 17, and 18 to hold flotation cells 20 apart. However, only three rows of flotation cells 20 coupled in system of cables 15' are included in the exemplary breakwater 10B. This provides for dissipation of the energy of ambient surface waves. Any number of such rows and interconnected cables could be included as wanted. Breakwater 10B is anchored by appropriate means to the ocean floor according to conventional practice. For example, cleats or loops L may be provided on some cells to receive lifting, towing, or anchoring lines. A multitude of individual anchor lines or tethers might be added that each extend between individual weights or anchors and separate flotation cells. This creates a tethered float breakwater having enhanced energy dissipation.

Figure 7:
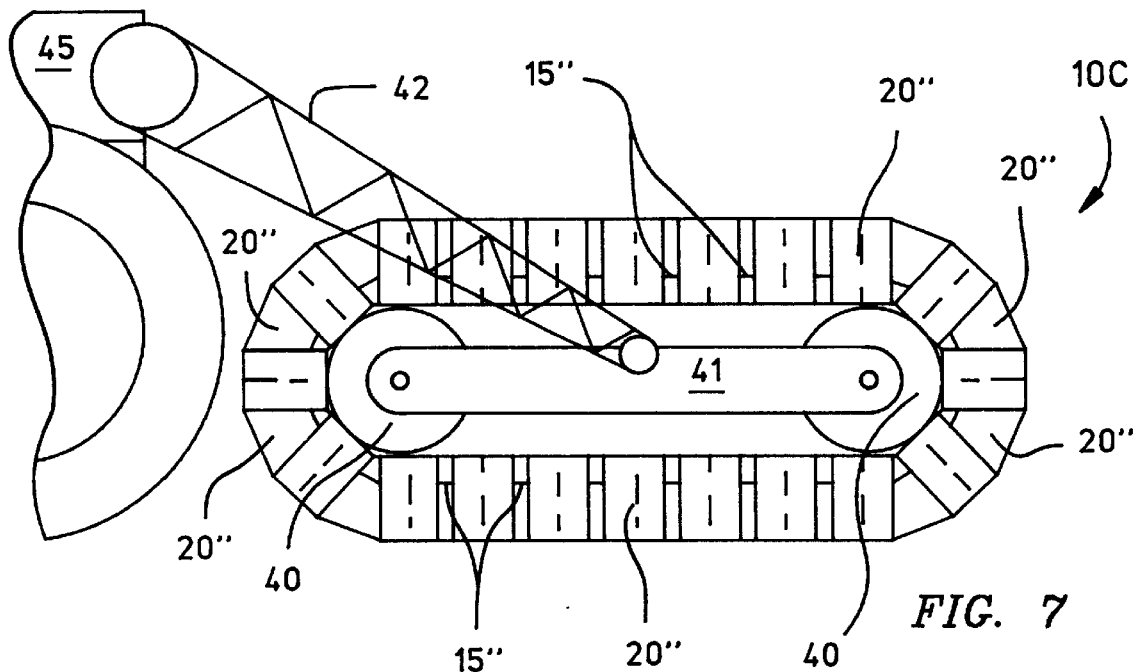
FIG. 7 is a side view of another embodiment of the invention shaped as an endless track for breaching mined areas.

FIG. 7 is a side view of another embodiment of the invention shaped as an endless track 10C for breaching mined areas. Track 10C is made up of substantially the same constituents as flotation platform 10 and breakwater 10B. An array of flotation cells 20" is secured to overlapping portions of system of cables 15", which, like platform 10 and breakwater 10B, can be made up of longitudinal cables, and two sets of obliquely crossing cables. Ends of the longitudinal cables of track 10C are secured together to form the endless track that is wrapped about at least one pair of rollers 40 journaled in framework 41. Framework 41 is connected to boom 42 that extends from tracked vehicle 45, such as a tank. Operators in vehicle 45 selectively articulate boom 42 to place track 10C on areas to be cleared of mines.

Track 10C is made up of a plurality of replaceable cells 20" which may or may not be selected from materials that float. It is a simple matter to repair or replace a cell if an exploding mine damages or destroys it. If a cell is damaged, merely apply some foam to the damaged area and allow the foam to cure; if a cell has been destroyed, add a replacement cell from inventory or replace a mold, fill it with foam and allow the cast cell to cure. Then, resume clearing the area.

This embodiment of the invention is intended to provide a movable platform that can be pushed across mine or obstacle fields on land or in the water and survive underwater detonations in the scale expected to be found in the surf zone, less than ten feet water depth. Ferrous materials and/or electrical conductors connected to a power source may be included in the cells and cables, if desired, so that track 10C also is effective against magnetic influence mines.

Figure 8:
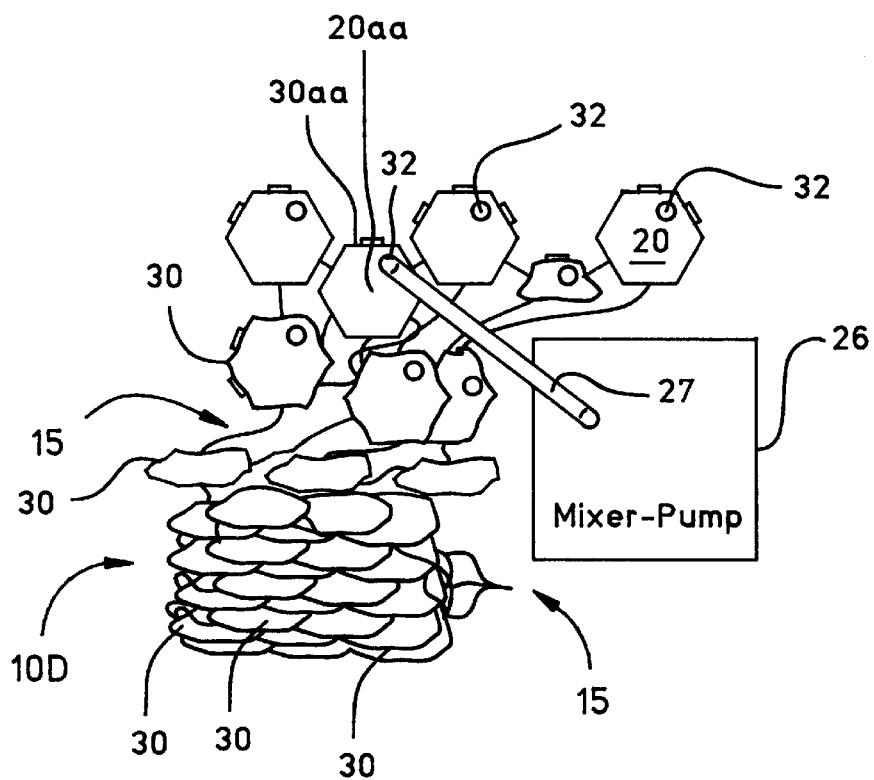
FIG. 8 is a top view of bundled preassembled cables and molds at the work site having one portion of exposed molds being filled with buoyant material.

Referring to FIG. 8, bundle 10D of preassembled cables 15 and molds 30 is transported to a remote work site and unloaded. Previously, the cables and attached molds were either rolled or folded together in bundle 10D at a distant depot or staging area to reduce the assembly time and work force at the work site. FIG. 8 shows bundle 10D partially unfolded to expose a portion of molds 30 and the attached cables. Foam mixing and pumping equipment 26 has at least one feeder hose 27 connected to valved fitting 32 on one of the exposed molds 30aa to form cell 20aa. Equipment 26 pumps the required amount of foam into each of the exposed molds 30 and then is turned off or disconnected from valved fittings 32. The one-way valve inside each valved fitting 32 closes each mold and holds the foam in the mold while it is given time to cure. This curing causes the foam to expand, fill, and harden in the full shape of the flotation cell that is defined by the mold, in this exemplary case, a hexagonally-shaped parallelepiped. After cells in the exposed portion of the molds have been cast, then other portions of the bundled molds and cables are unrolled or unfolded and cast. The process is repeated until all flotation cells are cast. The structure is completed at the work site and all that remains is to anchor it in place and, possibly, add decking to prevent excessive wear.

Figure 9A:
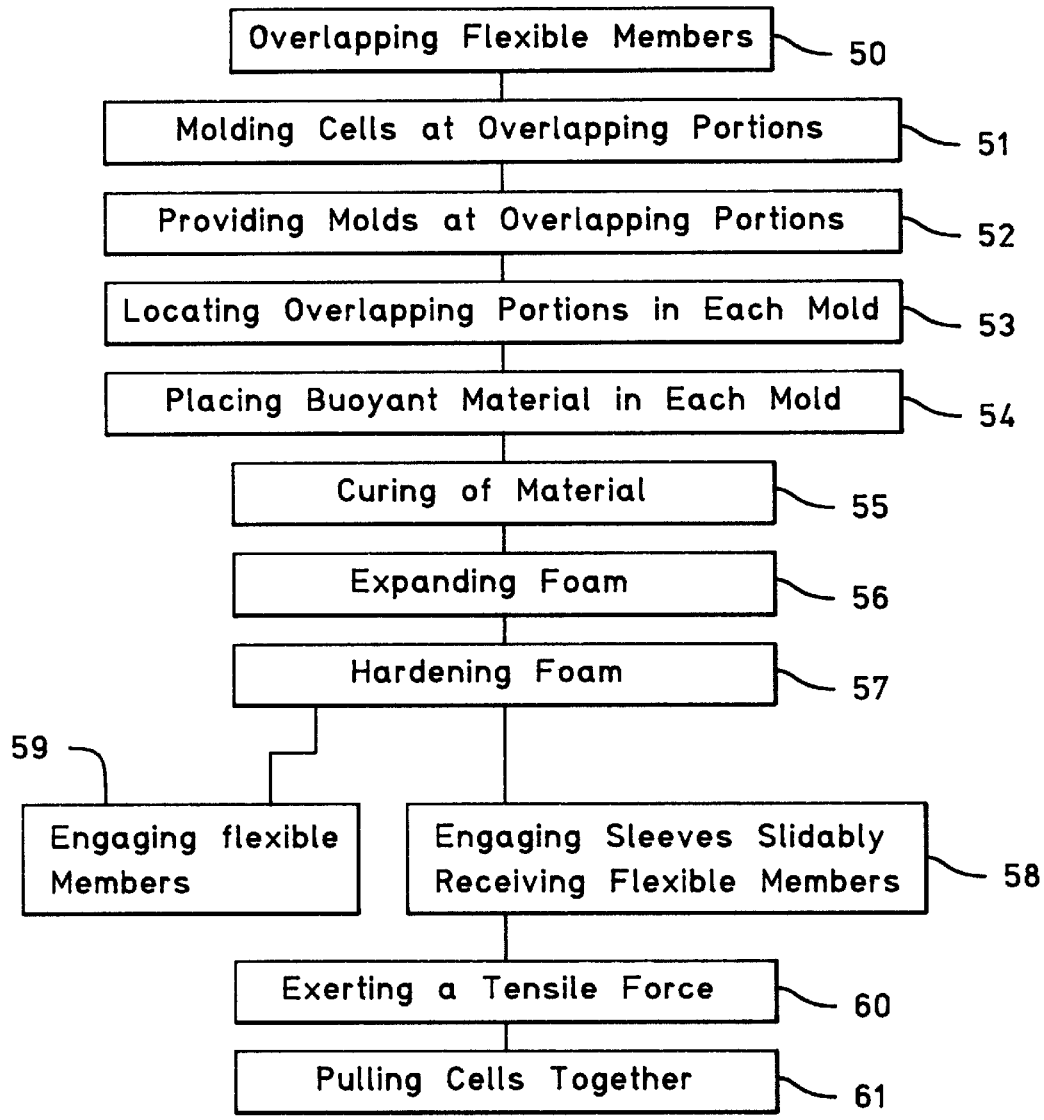
FIGS. 9A and B schematically depict methods of this invention.
Figure 9B:
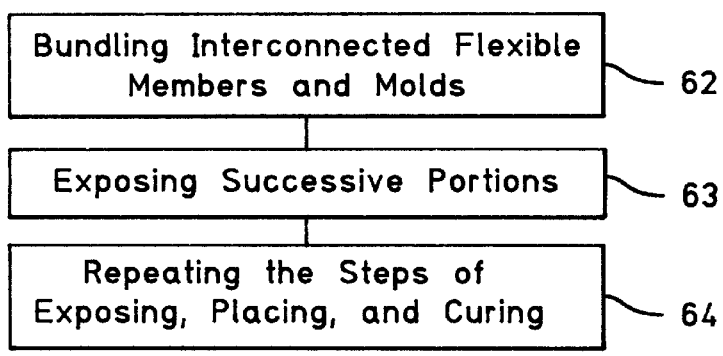

FIG. 9A depicts a method of the invention which provides structure for floating on water. Overlapping 50 flexible members, such as cables, precedes molding 51 cells of buoyant material at the overlapping portions. Molding 51 includes providing 52 a mold at each of the overlapping portions and locating 53 overlapping portions in each mold. Next, placing 54 buoyant material in each mold permits curing 55 of the buoyant material that includes expanding 56 and hardening 57 foam created from the buoyant material into buoyant cells shaped as hexagonally-shaped parallelepipeds. The method includes either engaging 58 sleeves that slidably receive the flexible members in the buoyant material in each mold or engaging 59 the overlapping portions of the flexible members by the buoyant material in each mold. Exerting 60 tensile forces on the flexible members that are slidably received in sleeves and pulling 61 the buoyant cells together provides a tightened-up structure that presents a flat upper surface. FIG. 9B shows bundling 62 interconnected flexible members and molds and exposing 63 a portion of the bundled flexible members and molds and repeating 64 the steps of exposing, placing, and curing portions of the bundled flexible members and molds to assure deployment of the structure.

Although the platform, breakwater and mine-clearing structures generally have been described as being fabricated from materials which produce cells which float, it is to be understood that readily repairable nonbuoyant cells could be molded from nonbuoyant materials where the need for a heavier structure is needed. This selection of well-known fabrication materials is within the purview of one skilled in the art having the teachings of this invention in hand.

The invention hereindescribed casts the cells in molds made from fabric, for example, nylon, "bags" that are manufactured in the correct shape and size. A typical hexagonal bag might measure in the neighborhood of about 4 ft×4 ft×4 ft. Thus, a cell of foam is self-healing since damaged cells could be left with their pieces in place in the "bag" of the mold and still fulfill their intended use.

The invention hereindescribed and claimed has the "bags" (molds) preattached to cables that may be bundled in a roll. The roll is unrolled and each bag is attached to the mixing equipment and filled. As the foam expands, the cells take the final shape. Since individual cells can easily be picked up by one man, the cells and cables are lightweight and portable. Accordingly, this invention can easily be used in remote areas since the work area can be built up from adjoining foam cells. The required components may be brought in by helicopter and do not require any roads or other support structures to be built. After the job is complete, the system could be dismantled and hauled out by helicopter.

Other applications have assembled sections that can be floated and joined with other sections to make the required shape and size, which could be floating airfields or breakwaters that extend for miles. The assembled sections can be pushed or towed into position using a landing craft air cushion vehicle or boat. Furthermore, the structure of this invention creates a firm base for the discharge of cargo and vehicles from landing craft air cushion vehicles. Locking rings, for example, could be attached to each section to simplify joining the sections. After the assembled sections are in position, they are anchored or secured to other sections. Any damaged cells could be repaired simply by adding foam to damaged cells, refilling molds with foam or replacing cells from inventory. The time required to emplace these systems could be as little as one tenth the time required using current approaches.

Assembled sections pushed in front of invasion vessels, will detonate contact type mines and will travel over or around obstacles. If a mine is detonated, the separation of the cells might reduce sustained damage by venting the explosion. If a cell, or a section of cells, is damaged, it is easy to repair by putting the foam in the damaged areas. Any obstacles encountered can be completely covered by the sections to allow passage of men, vehicles, and equipment.

It should be readily understood that many modifications and variations of the present invention are possible within the purview of the claimed invention. It is therefore to be understood that within the scope of the appended claims the invention may be practiced otherwise than as specifically described.

We claim:

1. A support structure comprising:
   a plurality of flexible members having separate overlapping portions thereof; and
   an array of molded cells each being disposed at one of said separate overlapping portions, said plurality of flexible members including longitudinal members extending through and between said molded cells, a first set of members obliquely extending across said longitudinal members and through and between said molded cells in a first direction and a second set of members obliquely extending across said longitudinal members and through and between said molded cells in a second direction.

2. A structure according to claim 1 in which said longitudinal members and said first and second sets of oblique members include said separate overlapping portions each having different parts of said longitudinal members and said first and second sets of oblique members.

3. A structure according to claim 2 further including:
   a plurality of molds each containing one of said molded cells and said different parts of said separate overlapping portions of said longitudinal members and said first and second sets of oblique members; and buoyant material in each mold to form said molded cells, said molds remaining on said molded cells after forming said molded cells therein.

4. A structure according to claim 3 in which each molded cell is attached to at least one flexible member.

5. A structure according to claim 4 in which said molds are fabricated from flexible material and have openings to receive said flexible members therethrough and to receive said buoyant material.

6. A structure according to claim 5 in which said buoyant material of said buoyant cells engages said separate overlapping portions.

7. A structure according to claim 2 in which each of said molded cells is molded from buoyant material in a separate mold that also contains different parts of said separate overlapping portions of said longitudinal members and said first and second sets of oblique members, and each mold is removed from each molded cell after curing of said buoyant material.

8. A support structure comprising:

a plurality of flexible members having overlapping portions thereof, said plurality of flexible members including longitudinal members, a first set of members obliquely extending across said longitudinal members in a first direction, and a second set of members obliquely extending across said longitudinal members in a second direction, said longitudinal members and said first and second sets of oblique members including said overlapping portions;

an array of molded cells each being disposed at separate overlapping portions of said flexible members;

a plurality of molds each containing one of said molded cells and separate overlapping portions of said longitudinal members and said first and second sets of oblique members; and buoyant material in each mold to form said molded cells, said molds remaining on said molded cells after forming said molded cells, each molded cell being attached to at least one flexible member, said molds being fabricated from flexible material having openings to receive said flexible members therethrough and to receive said buoyant material, said buoyant cells each including a plurality of sleeves that each slidably receives a separate flexible member therethrough.

9. A support structure comprising:

a plurality of flexible members having overlapping portions thereof, said plurality of flexible members including longitudinal members, a first set of members obliquely extending across said longitudinal members in a first direction, and a second set of members obliquely extending across said longitudinal members in a second direction, said longitudinal members and said first and second sets of oblique members including said overlapping portions;

an array of molded cells each being disposed at separate overlapping portions of said flexible members;

a plurality of molds each containing one of said molded cells and separate overlapping portions of said longitudinal members and said first and second sets of oblique members; and buoyant material in each mold to form said molded cells, said molds remaining on said molded cells after forming said molded cells, each molded cell being attached to at least one flexible member, said molds being fabricated from flexible material having openings to receive said flexible members therethrough and to receive said buoyant material, said buoyant cells each including a plurality of sleeves that each slidably receives a separate flexible member therethrough, and said buoyant cells being hexagonally-shaped parallelepipeds.

10. A structure according to claim 9 in which each of said flexible members is selected from the group of structural elements consisting of natural fibers, manmade fibers, metal cables, and nonmetal cables.

11. A structure according to claim 10 further including:

bearing plates coupled to flexible members disposed on outer surfaces of some of said buoyant cells.

12. A support structure comprising:

a plurality of flexible members having overlapping portions thereof, said plurality of flexible members including longitudinal members, a first set of members obliquely extending across said longitudinal members in a first direction, and a second set of members obliquely extending across said longitudinal members in a second direction, said longitudinal members and said first and second sets of oblique members including said overlapping portions;

an array of molded cells each being disposed at separate overlapping portions of said flexible members;

a plurality of molds each containing one of said molded cells and separate overlapping portions of said longitudinal members and said first and second sets-of oblique members; and buoyant material in each mold to form said molded cells, said molds remaining on said molded cells after forming said molded cells, each molded cell being attached to at least one flexible member, said molds being fabricated from flexible material having openings to receive said flexible members therethrough and to receive said buoyant material, said buoyant material of said buoyant cells engaging said overlapping portions, and said buoyant cells being hexagonally-shaped parallelepipeds.

13. A structure according to claim 12 in which each of said flexible members is selected from the group of structural elements consisting of natural fibers, manmade fibers, metal cables, and nonmetal cables.

* * * * *